United States Patent [19]

Rossler et al.

[11] 4,195,120

[45] Mar. 25, 1980

[54] HYDROGEN EVOLUTION INHIBITORS FOR CELLS HAVING ZINC ANODES

[75] Inventors: Eleanor J. Rossler, Lorne Park; Franciszek J. Przybyla, Mississauga, both of Canada

[73] Assignee: P. R. Mallory & Co. Inc., Indianapolis, Ind.

[21] Appl. No.: 957,387

[22] Filed: Nov. 3, 1978

[51] Int. Cl.² ............................................. H01M 10/44
[52] U.S. Cl. ......................................... 429/50; 429/57; 429/198; 429/206; 429/229
[58] Field of Search .................. 429/198, 57, 206, 50, 429/229-231

[56] References Cited

U.S. PATENT DOCUMENTS

| | | | |
|---|---|---|---|
| 3,057,944 | 10/1962 | Ruetschi et al. | 429/212 |
| 3,348,973 | 10/1967 | Dirkse | 429/206 |
| 3,653,965 | 4/1972 | Lee | 429/198 |
| 3,847,669 | 11/1974 | Paterniti | 429/198 X |
| 3,963,520 | 6/1976 | Bauer et al. | 429/206 |

*Primary Examiner*—Charles F. Lefevour
*Attorney, Agent, or Firm*—Ronald S. Cornell; Israel Nissenbaum; Martin M. Glazer

[57] ABSTRACT

Hydrogen evolution in cells having zinc anodes is reduced or eliminated by incorporating in the cell a surfactant which is a complex phosphate ester of a surfactant of the ethylene oxide-adduct type. This surfactant is added in such a manner that, directly or upon wetting of the anode by the electrolyte, there is an adsorption of surfactant on the surface of the zinc anode material, whereby hydrogen evolution is inhibited. The surfactant is desirably present in the cell in an amount of from 0.001% to 5% by weight of the zinc component of the cell.

10 Claims, No Drawings

HYDROGEN EVOLUTION INHIBITORS FOR CELLS HAVING ZINC ANODES

FIELD OF THE INVENTION

This invention relates to electrochemical cells having zinc anodes, and particularly to primary or secondary cells having zinc anodes and alkaline electrolytes, and provides a gassing inhibitor to inhibit or preclude hydrogen evolution within such cells, such inhibitors comprising an organic phosphate ester surfactant.

BACKGROUND OF THE INVENTION

Alkaline cells, which may be operated either as cells or incorporated in batteries, and being either primary or secondary types, have been known for a considerable period of time. Such cells generally have zinc as the major anode component, usually in the form of a zinc amalgam powder or screen, but may have other anodes such as, for example, cadmium. Such cells may also have a variety of cathode depolarizers, such as silver oxide, mercuric oxide, manganese dioxide, nickel oxide, air, etc.; and may, as noted, be primary or secondary.

A common feature of such cells is that they have an alkaline electrolyte comprising an aqueous solution of an alkali metal or ammonium hydroxide such as sodium hydroxide, potassium hydroxide, lithium hydroxide, or the like. In any event, the cell is retained in a conductive container or can which has a positive terminal electrically associated with the cathode and a negative terminal electrically associated with the anode; the positive and negative terminals being electrically insulated from each other. The separator may comprise one or more than one layer, at least one of which is an electrolyte absorbent separator and another of which may be an ionically conductive barrier layer. The positive and negative terminals are electrically insulated one from the other by a grommet or insulating sleeve, and the cell is generally sealed or closed by crimping, tooling or swaging.

Various adjuvants may be included in such cells. For example, the anode mixture may have up to 10% by weight of mercury and up to 3% by weight of a gelling agent or thickening agent of the sort generally used for alkaline electrolytes, (for example carboxymethyl cellulose) together with zinc powder. Similarly, there may be up to 8% zinc oxide dissolved in the electrolyte. The separator may comprise a cellulosic or other electrolyte permeable polymer material. Depending on the size of the cell, and the nature of the system in which it is used, the anode may be placed in the cell in the form of a pellet or a gel, or poured into a cavity containing electrolyte.

The use of surfactants in cells has been known. For example, Ruetschi et al., in U.S. Pat. No. 3,057,944 issued Oct. 9, 1962, disclose a silver oxide cathode in a primary or secondary system having a surface active heteropolar substance admixed either to the electrolyte or to the silver oxide cathode.

Paterniti, in U.S. Pat. No. 3,847,669 issued Nov. 12, 1974, discloses the incorporation of an ethylene oxide polymer in a zinc/manganese dioxide cell so as to reduce the amount of mercury component required in a cell to provide adequate shelf life therefor. The ethylene oxide additives used by Paterniti are generally soluble in water, and may be used either to pre-wet the separator or they may be added directly to the zinc during the preparation of a gel from which the anode is formed.

Bauer et al., in U.S. Pat. No. 3,963,520, issued June 15, 1976 incorporate a corrosion inhibitor in the form of a saturated or unsaturated monocarboxylic acid with at least two ethanolamide radicals. Bauer et al. teach that their inhibitor may be dispersed in the zinc powder, or that it may be incorporated in the separator or added to the electrolyte. Bauer et al., together with Paterniti, have as their prime purpose to reduce the amount of mercury incorporated in the cell.

Lee, in U.S. Pat. No. 3,653,965 issued Apr. 4, 1972, discloses a rechargeable galvanic cell having a zinc anode and a zinc-containing electrolyte. Lee incorporates ethylene oxide polymers or their derivatives in the electrolyte, so as to suppress zinc dendrite formation during the charging cycle of the cell, thereby precluding or inhibiting the growth of zinc dendrites which can pierce the separator and ultimately cause internal short circuit within the cell.

Dirkse, in U.S. Pat. No. 3,348,973 issued Oct. 24, 1967, discloses a secondary battery where an additive having the general formula of tridecyloxypoly(ethylenoxy) ethanol is incorporated in the electrolyte or in the zinc anode, preferably in the zinc anode. Dirkse states that the life of the cell is significantly prolonged by use of the additive.

DESCRIPTION OF THE INVENTION

This invention relates to the incorporation into cells of a surfactant of a type that will act as a hydrogen evolution inhibitor. Useful surfactants in accordance with this invention are organic phosphate esters. Such surfactants will generally be a monoester or a diester having the following formula:

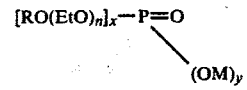

where
x+y=3
M=H, ammonia, amino, or an alkali or alkaline earth metal
R=phenyl or alkyl or alkylaryl of 6–28 carbon atoms Specific useful phosphate ester surfactants include materials which can be identified by their commercial designation as GAFAC RE610, GAFAC RA600 and KLEARFAC AA-040.

In order that the surfactant or a surfactant/gelling agent mix may be incorporated in the cell it has been found that the additive may be added in various ways. For example, it may be added to the anode or cathode mixture, incorporated in the electrolyte at the time that the electrolyte is charged into the cell, or incorporated in the separator by pre-wetting or impregnating the separator with the additive. In all events, however, it has been found that the incorporation of a surfactant additive of the type referred to herein in a cell in an amount of from 0.001% to 5%, preferably 0.005 to 1%, most preferably 0.01 to 0.3% by weight of the active anode component of the cell, may preclude or at least significantly inhibit the evolution of hydrogen within the cell, and thereby increase its shelf life and its useful work life.

The surfactants disclosed herein are soluble or dispersible in water and somewhat soluble in the alkali metal hydroxide solutions used as electrolytes. It has been found that, in general, such surfactants will form a collodial dispersion in the electrolyte, which dispersion is not stable so that, over a period of time, most of the surfactant additive will separate from the electrolyte and be dispersed onto the surfaces to which the electrolyte has been exposed, and it is believed that the surfactant will adhere to those surfaces. Thus, it is possible to admix the surfactant additive to the anode material, as well as to disperse it in the electrolyte or pre-wet or impregnate a separator, depending on the type of cell and the manufacturing steps being used during its production.

Use of the type of surfactant specified above imparts greatly improved hydrogen evolution characteristics, by which is meant that hydrogen evolution is significantly reduced. However, another unexpected improvement by what is an apparent synergistic effect of the combination of a gelling or thickening agent of the type generally used for alkaline electrolytes together with a surfactant of the organic phosphate ester type in the anode mixture of the cell has also been noted; namely, the shelf life and the useful life of cells having an additive as referred to herein are enhanced.

By incorporating surfactants of the organic phosphate ester type together with a gelling or thickening agent of the sort generally intended for use with alkaline electrolytes, e.g. in cells having zinc anodes, it has been found that the hydrogen evolution characteristics of the cell are unexpectedly improved, when compared with similar cells which do not have such additives. When an additive of the sort referred to herein is incorporated in the anode mixture, it is believed to form an adsorbed layer or coating on the zinc particles of the anode so that the additive remains at the electrolyte/zinc interface. Likewise, an additive when dispersed in the electrolyte, appears to coagulate therefrom in time, and to adsorb on solid surfaces including zinc powder, and the same inhibition of hydrogen evolution is noted. Another way in which the surfactant additive may be added to the cell, rather than directly dispersing it into the electrolyte as it is charged into the cell, is to dispense a small portion of the electrolyte with the required amount of surfactant dispersed therein into the cell before the remainder of the electrolyte which is ordinarily to be dispensed into the cell is placed therein.

It has also been noted that the surfactant may be added to the depolarizer—the cathode—of a cell; and it is postulated that because the surfactant is at least somewhat soluble in the electrolyte it will, in time, transport across the separator of the cell to the anode so as to form a coating or adsorbed layer thereon at the zinc/electrolyte interface.

It has also been noted that the separator material may be pre-wetted or impregnated with a sufficient quantity of surfactant additive which, after assembly of the cell, will migrate to the anode in the manner discussed above.

Gelling agents or thickeners for alkaline electrolytes which have been successfully used include various cellulosic gums and compounds such as carboxymethylcellulose, other cellulosic thickening agent, flocculants, polyarcylamide, amylopectin starch, tapioca starch and guar gum.

Several examples follow which illustrate the application of this invention, and the advantages derived therefrom in respect of hydrogen evolution inhibition in alkaline cells having zinc anodes. In the examples, as throughout the specification and claims, all parts are parts by weight unless otherwise indicated.

EXAMPLE 1

During the preparation of a conventional mixture of zinc amalgam powder and 2% carboxymethylcellulose (CMC) in a blender, 0.01% of the surfactant KLEARFAC AA-040* by weight of the zinc amalgam was added to the zinc amalgam powder—CMC mixture. The zinc amalgam—CMC—surfactant mixture was made in a blender by the addition of a pre-measured amount of the surfactant in demineralized water in just sufficient quantity to permit mixing thereof with the zinc amalgam powder—CMC mixture. Thereafter, $Zn/MnO_2$ AA size alkaline cells were manufactured using that anode blend in a standard commercial process and tested together with standard cells manufactured without the surfactant additive. The standard cells evolved greater than 4.0 millilitres of hydrogen over a period of 18 days when they were held at a temperature of 160° F. for that period, whereas the cells into which 0.01% by weight of KLEARFAC AA-040 surfactant had been incorporated evolved less than 0.2 millilitre of gas over 20 days when held at 160° F. (Holding cells at 160° F. for a period of 7 days is generally regarded as equivalent to one year of shelf life of such cells at room temperature).

*An anionic mono substituted ortho phosphate ester supplied by BASF Wyandotte Corp.

EXAMPLE 2

GAFAC RA600* as a 5% aqueous solution was introduced into electrolyte flowing through a metering pump during conventional alkaline $Zn/MnO_2$ cell manufacturing steps. Sufficient quantity of the GAFAC RA600 was added to the electrolyte to be dispensed into the cell to achieve a concentration of 0.1% of this surfactant by weight of the zinc component of a completed cell. It has been noted that because this surfactant is in general not greatly soluble but is dispersible in electrolyte a cloudy emulsion of the same was formed. The electrolyte-surfactant dispersion was then dispensed into standard C size cells during conventional manufacturing steps, and tested against cells manufactured on the same line but without the surfactant additive. The cells without the additive evolved more than 6.0% millilitres of gas in 21 days at 160° F.; while the cells with the additive evolved less than 0.5 millilitre of gas in 21 days at 160° F.

*An anionic organic phosphate ester supplied as the free acid, based on a linear primary alcohol, and being an unneutralized partial ester of phosphoric acid.

EXAMPLE 3

A small portion of electrolyte having an anionic organic phosphate ester surfactant identified as GAFAC RE-610* therein, in sufficient quantity to give approximately 0.1% surfactant by weight of zinc component of the cells was dispensed into cells before the ordinary electrolyte was dispensed into the cells. Results similar to those noted in Example 2 above, were noted.

*An anionic complex organic phosphate ester supplied as the free acid, having an aromatic hydrophobe, and being an unneutralized partial ester of phosphoric acid.

EXAMPLE 4

Electrolyte having a complex organic phosphate ester surfactant (GAFAC RE-610) dispersed therein was added to the depolarizer (cathode) of a button-type $Zn/MnO_2$ cell. Tests over a period of 45 days showed significantly improved gas evolution characteristics (lower gas evolution rate) when compared to similar cells without the surfactant additive.

EXAMPLE 5

A complex organic phosphate ester* was added to the electrolyte of a conventional alkaline $Zn/MnO_2$ C-size cell in an amount of 0.1% based upon the weight of the anode. Extended tests showed a significant diminution in the rate of hydrogen evolution when compared with cells not having any added phosphate ester.

*The ester is a mixture of mono- and di-esters having the formula $[R(OCH_2CH_2)_nO]_xPO(OH)_y$ wherein R is a mixture of linear alkyl radicals having 12-16 carbon atoms and said ester has a specific gravity of 1.07 at 25° C. and a viscosity of about 600cks at 50° C. (Ostwald-Fenske).

EXAMPLE 6

Zinc/manganese dioxide, alkaline button cells were manufactured, where the depolarizer of the cells comprised a substantially dry mixture of $MnO_2$ and graphite. A 10% aqueous solution of an organic phosphate ester surfactant (GAFAC RA600) was added to the dry $MnO_2$ mixture in an amount sufficient to provide 0.4% surfactant by weight of the $MnO_2$-graphite mixture, following which a 45% aqueous solution of potassium hydroxide in an amount of 8% by weight of the $MnO_2$-graphite mixture was mixed with the depolarizer mix in a blender. Tests over a period of 45 days showed significantly improved gas evolution characteristics when compared to conventional cells having no phosphate surfactant present.

EXAMPLE 7

A cell separator was impregnated with a 5% aqueous solution of an organic phosphate ester surfactant (GAFAC RA600). Thereafter, an alkaline $Zn/MnO_2$ C-size cell was assembled using conventional methods. Comparing cells having pretreated separators with cells without the phosphate surfactant additive showed significantly improved hydrogen evolution characteristics for the cells treated in accordance with this invention.

Further tests with other zinc couples, including zinc/air, zinc/mercuric oxide and zinc/nickel oxide have indicated similar results.

The examples given above have been for purposes of illustration of the invention and its applicability, and are not intended to be restrictive to the scope of the invention which is more particularly defined in the appended claims.

We claim:

1. An alkaline cell having a cathode, an anode and at least one electrolyte carrying separator disposed between said cathode and said anode, the combination being retained in a conductive container having a positive terminal electrically associated with said cathode and a negative terminal electrically associated with said anode, said terminals being electrically insulated from each other, said anode being predominantly zinc; and said cell having therein a surfactant which is an organic phosphate ester of the ethylene oxide-adduct type in an amount of from 0.001% to 5% by weight of the zinc component of said cell.

2. The cell of claim 1 where said surfactant is present in an amount of 0.01% to 0.3% by weight of zinc.

3. The cell of claim 2 where said surfactant is admixed with zinc amalgam powder to form said anode.

4. The cell of claim 1 wherein said surfactant includes a hydrophobic portion which is selected from the group consisting of alkyl, phenyl and alkylaryl hydrocarbons of from six to twenty-eight carbon atoms.

5. A process for inhibiting gas evolution in an alkaline cell which has a cathode, a predominantly zinc anode and at least one electrolyte carrying separator comprising incorporating a surfactant which is an organic phosphate ester of the ethylene oxide-adduct type in said cell in an amount of about 0.001% to 5% by weight of the zinc component of said cell.

6. The process of claim 5 where said surfactant is present in an amount of 0.01% to 0.3% by weight of zinc.

7. The process of claim 5 wherein said surfactant is added to said zinc amalgam by admixing a solution of surfactant in just sufficient water to permit mixing thereof with said zinc amalgam.

8. The process of claim 5 wherein said surfactant is incorporated in said cell by dispersion in the electrolyte prior to placing said electrolyte in the cell.

9. The process of claim 5 wherein said surfactant is incorporated in said cell by impregnating said separator prior to placing said separator in the cell.

10. The process of claim 5 wherein said surfactant is incorporated in said cathode.

* * * * *